(12) United States Patent
Nelson et al.

(10) Patent No.: US 6,439,061 B1
(45) Date of Patent: Aug. 27, 2002

(54) AIRFLOW MEASURING ASSEMBLY FOR AIR HANDLING SYSTEMS

(75) Inventors: Gary D. Nelson, Minneapolis; Ronald C. Rothman, Duluth, both of MN (US); Larry Palmiter, Seattle, WA (US)

(73) Assignee: The Energy Conservatory, Minneapolis, MN (US)

( * ) Notice: Subject to any disclaimer, the term of this patent is extended or adjusted under 35 U.S.C. 154(b) by 0 days.

(21) Appl. No.: 09/539,085

(22) Filed: Mar. 30, 2000

Related U.S. Application Data (60) Provisional application No. 60/127,117, filed on Mar. 31, 1999.

(51) Int. Cl.[7] .................................................. G01F 1/46
(52) U.S. Cl. .................................................. 73/861.65
(58) Field of Search ........................... 73/861, 861.65, 73/861.66, 861.67, 861.68

(56) References Cited

U.S. PATENT DOCUMENTS

| | | |
|---|---|---|
| 3,964,519 A | 6/1976 | De Baun |
| 3,978,728 A | 9/1976 | Cutler |
| 4,052,897 A | 10/1977 | DeBaun |
| 4,331,037 A | 5/1982 | Du Vall |
| RE31,258 E | 5/1983 | De Baun |
| 4,394,825 A | 7/1983 | Du Vall |
| 4,471,654 A | 9/1984 | Du Vall |
| 4,481,829 A | 11/1984 | Shortridge |
| 4,494,406 A | 1/1985 | Komons et al. |
| 4,559,835 A | 12/1985 | DeBaun |
| 4,581,930 A | 4/1986 | Komons |
| 4,735,100 A | 4/1988 | Haito |
| 4,787,251 A | 11/1988 | Kolodjski |
| 5,343,744 A | 9/1994 | Ammann |
| 5,596,152 A * | 1/1997 | Bergervoet et al. ...... 73/861.83 |
| 6,053,056 A * | 4/2000 | Zaiser et al. ............. 73/861.61 |

OTHER PUBLICATIONS

Ebtron, Inc., "Electronic Air Flow Measurement Systems", product brochures, 1987, 1988, Belle Mead, NJ.
Air Monitor Corporation, "Airflow Measurement And Control Products", catalog, 1982, Santa Rosa, CA.
TSI, INC., "Air Volume Measurements", product brochure, 1997, Shoreview, MN.
Dieterich Standard Corporation, "Annubar Flow Measurement," catalog, 1980, Boulder, Co.

* cited by examiner

*Primary Examiner*—Max Noori
(74) *Attorney, Agent, or Firm*—Anthony G. Eggink (57) ABSTRACT

An airflow measuring assembly and method for an air handling system, such as an HVAC system. The assembly is constructed and arranged to direct a measurable air stream to quantify airflow through an air handling system. The assembly includes a plate structure with at least one aperture and airflow sensors. The assembly is adapted for placement in a slot of an air handler and may simulate the flow resistance of HVAC filters. The airflow sensors may be positioned with respect to the plate structure to provide averaged total and static pressure signals. A manometer may be connected to the assembly to provide pressure differential readings and which may be converted via mathematic formulas to provide the volumetric airflow rate through the air handling system.

37 Claims, 6 Drawing Sheets

AIRFLOW MEASURING ASSEMBLY FOR AIR HANDLING SYSTEMS

This application claims the benefit of U.S. Provisional Application No. 60/127,117 filed on Mar. 31, 1999.

BACKGROUND OF THE INVENTION

This invention relates generally to airflow measuring assemblies and particularly to airflow measuring assemblies and methods to measure airflow in air handling equipment. The assemblies of the invention are constructed and arranged for placement in an air handling system and to condition or direct the airflow of the system into a controlled fluid stream for analysis. The measuring assemblies and methods provide accurate and reproducible airflow measurements for the air handling equipment being monitored or tested. More particularly, the assemblies of this invention are constructed and arranged for use in forced air HVAC distribution systems. The airflow measuring assembly is constructed to be placed in a predetermined location of a forced air distribution system, for example, in a slot proximate the air handler unit.

It is important for air handling equipment, such as furnaces, heat pumps and air conditioners to have proper airflow to insure efficient operation of the HVAC systems. Specified airflow or air volume rates are required to be within specified airflow ranges for particular air handling systems. The flow of air is typically measured to insure that a forced air distribution system, for example, was properly designed and installed, and is operating according to the specification. For example, it is important to avoid low airflow in heat pumps, furnaces and air conditioners because reduced airflow results in performance inefficiency and can damage the compressor. Determining an unusually low or high airflow may indicate that a leak in the system or insufficient ventilation exists.

A forced air distribution system typically includes an air handler unit, ductwork, registers, dampers, filters, etc. Although the airflow measuring assembly may be utilized in connection with any air handler unit, which contains the blower, the assembly may also be utilized at any location within the air distribution system. Preferably, the assembly is used in the filter position of the air distribution system. Depending upon the similarity of flow resistance between the assembly and the filter typically installed in the air distribution system, a correction factor is calculated and used in the method of the invention.

Airflow is preferably measured, however, proximate the air handler unit of the air handling assembly, where proper airflow is important for efficient operation of the equipment. Although the airflow measuring assembly may be positioned, permanently or removably, at a number of locations in an air handling assembly, it has been found that the air filter slot typically provided in air handling equipment provides an efficient, easy and convenient place for such airflow measurement. However, it is within the purview of the invention to utilize other positions or specified slots in an air handling assembly to make such airflow measurements. Thus, the airflow measuring assembly of the invention may be pre-installed in a furnace proximate the blower, may be positioned for use in a specified slot across the airstream, may be positioned in the filter slot of air handling equipment and in the filter slot of a forced air distribution system, whether proximate the blower unit or remote therefrom.

In residential furnaces, for example, a specified volume of air is heated and distributed throughout a house and is returned to the furnace by the air return duct system. It is desirable to measure the flow of air through the furnace, in order to insure airflow within the specified operating range of a furnace. The airflow measuring assemblies of this invention measure airflow in a furnace, such as at the filter position, and are constructed to be placed into the furnace filter slot or a similar position in the furnace. This placement has been found to provide a convenient, accessible location for the accurate air volume flow rate measurements. The airflow measuring assemblies are constructed and arranged to condition and direct the airflow therethrough and to measure the airflow via the use of an anemometer, for example, or by measuring a pressure signal generated by the assembly. In the latter assembly, a differential pressure signal generated from single or multiple designed pressure signal locations within the controlled fluid stream can be obtained and converted into volumetric airflow utilizing mathematical relationships. The assemblies of the invention may also be constructed and arranged to simulate the resistance of a typical filter for accuracy and reproducibility of the airflow measurements. Furthermore, a correction factor based on air handler system pressures measured with a typical filter, and again, with the assembly can be derived for improved accuracy. The correction factor accounts for the difference in airflow resistance between the test assembly and filter and is used to correct the measured airflow of the system by the test assembly.

Although the utilization of the airflow measuring assembly of the invention at or near the air handler may be preferred, the assembly may also be used at other locations of an air handler assembly. For example, filter holders may be built into ductwork or positioned at the return grille of the system. If the assembly is installed remotely from the furnace or air handler, duct leakage between the assembly and the air handler may exist and needs to be taken into consideration. Further, if the pressure drop across the filter is significantly different from that of the airflow measuring assembly, this difference is taken into consideration by calculating a correction factor.

Various airflow measuring assemblies and methods to estimate volumetric airflow have been proposed and used in the past, however, these prior art assemblies and methods have drawbacks and difficulties. Prior art methods and devices have often been found to be burdensome, difficult to use and yield inaccurate and unrepeatable results for purposes of measuring airflow in air handling equipment. For example, prior art devices typically require more care in proper use to obtain accurate results than installers or others have time to provide. Prior art assemblies and techniques include the utilization of heating elements in an air stream and a calibrated fan assembly used to deliver air to the return side of the air handler. However, accuracy in result and the time consumption required, to utilize these prior art techniques are undesirable for general testing usage. Other prior art assemblies use pitot tubes or like devices to measure air velocity pressures at various locations in a system and convert the measurement to volumetric airflow. Other prior art assemblies measure airflow at air outlets by trapping air in large capture hood devices. Capture hood devices are often difficult to seal over registers and return grilles due to obstructions and their respective locations, i.e., due to furniture, under cabinet locations, etc. And, because capture hood devices measure airflow at the registers and return grilles, any duct leakage is not accounted for when airflow at the air handler is desired.

Still other prior art devices attempt to have as little effect as possible on air flow by minimizing the pressure loss through the measuring device. The latter devices tend to be very sensitive to upstream conditions and require long lengths of straight duct to be accurate. Such lengths of straight duct often do not exist in actual installed systems. On the other hand, the assembly and method of this invention have been found through experimentation to be insensitive to upstream conditions. In summary, known prior art assemblies and methods are difficult and cumbersome to use and do not necessarily provide accurate airflow measurement at the air handler, where such measurement is most useful and yield more accurate and reproducible results.

Prior art assemblies, as far as is known, have not been developed to measure airflow at the air filter location of an air handler, for example. The airflow measuring assembly of the present invention overcomes the difficulties in use and inefficiencies of the prior art. The measuring assemblies of the present invention provide fast, easy and accurate means to measure the airflow in a forced air HVAC system or the like by placement of the assembly into the filter section or a similar position within the system.

Another benefit of the measuring assembly of the present invention is that it permits a more accurate derivation of duct efficiency. Duct efficiency equations are generally dependent upon airflow through the air handler. The accurate measurements provided by the present invention thereby yield more accurate calculations of duct efficiency.

It is a further object of this invention to provide airflow measuring assemblies which are adjustable in size to accommodate various air handler filter slot dimensions.

SUMMARY OF THE INVENTION

The present invention relates to an airflow measuring assembly and method which conditions and directs a fluid stream for analysis. The invention further relates to an airflow measuring assembly having airflow sensors for providing a differential pressure signal to determine volumetric airflow in air handling equipment. The assemblies are constructed and arranged to be positioned into a filter slot, for example, or other position of an air handler system. The assembly in a filter slot preferably approximates the filter resistance in conditioning the airflow to provide easy and accurate airflow measurements. Airflow correction factors are calculated in the method of the invention. Correction factors either based on filter parameters or measured at the time of testing may be utilized. For example, charts or tables with empirical data may be developed with correction factors for various models and sizes of filters. Alternatively, to correct for the change in airflow at the time of testing, a representative static pressure in the air handling system is measured both when the filter is in place and again when the measuring assembly is in place. For example, for two static pressure readings $P_1$ and $P_2$, respectively, the corrected flow is the flow through the test assembly multiplied by the square root of $P_1/P_2$.

The airflow measuring assemblies of the present invention are comprised of a plate structure having at least one aperture therethrough to precondition and direct an airflow stream for measurement. The plate structure is preferably adjustable in area to accommodate various air handler slots, such as filter slots, or duct sizes. The plate structure is constructed so that inserts or extensions may be added to the assemblies to insure a proper fit and minimal leakage. The plate structure may have a plurality of apertures with airflow sensors and may utilize various sensor and aperture patterns to precondition and direct airflow and to approximate filter resistance to thereby provide accurate and measurable airflow streams.

The airflow measuring assembly of the invention is constructed and arranged to provide a pressure differential measurement comprised of an upstream pressure signal and a downstream pressure signal which are generated from designed pressure signal locations in the controlled airflow stream. The upstream pressure signal may be equated to the total pressure in the air stream before going through the conditioning aperture of the assembly. The downstream pressure signal may be equated to the static pressure after conditioning, which depends on the volumetric flow rate, plate aperture geometry, fluid density and viscous losses. The differential between the total pressure and the static pressure is defined as the dynamic pressure. In this case, the readily measurable dynamic pressure correlates to the airflow of the fluid distribution system.

Airflow measuring means or air pressure sensors are positioned within each plate aperture to measure airflow. For example, an anemometer may be used to measure airflow and alternatively, total and static pressure sensors, which may be interconnected to provide an average value of the respective pressure signals, may also be used to provide the dynamic air pressure and thus provides the airflow measurement. In the latter method, apertures in the air pressure sensors to measure total and static pressure are disposed behind the plane of the plate structure. The assemblies of the latter invention are provided with connectors for attachment to a differential pressure manometer. The manometer provides the difference between the total and static pressure signals and from which airflow may be calculated.

To provide an accurate and repeatable volumetric airflow rate for air handling equipment is the primary object of the present invention. The flow plate provides a controlled fluid flow stream which may be measured by various sensors which can be converted to volumetric airflow. For example, using a mathematical relationship, the differential pressure signals may be converted to volumetric airflow. In summary, the volumetric airflow rate provided by the present invention aids in verifying that the air handling equipment was properly designed and installed and is operating within the airflow range specified for efficient use. The volumetric airflow rate can be used as inputs to calculate the duct and/or furnace efficiency.

These and other benefits of this invention will become clear from the following description by reference to the drawings.

DESCRIPTION OF THE PREFERRED EMBODIMENTS

The present invention relates to an airflow measuring assembly which directs a controlled fluid stream for measuring airflow at a predetermined position of air handling equipment, i.e., in forced air HVAC distribution systems. The measuring assembly of this invention is particularly efficient and accurate in permitting the volumetric airflow and the efficiency of a duct system and/or furnace to be calculated.

The airflow measuring assemblies of this invention are designed to include use in forced air distribution systems. A typical forced air furnace will be used herein to describe the construction and use of the airflow measuring assemblies of the invention. A furnace, such as a forced air heating system, pulls air at room temperature by means of a blower into the heat exchange area of the furnace and then sends conditioned air through a duct and register distributing system of a house or building. Air return ducts channel air back to the furnace using the pulling force of the blower, which drives the air through the air filter typically positioned in the slot of the furnace.

Figure 1:
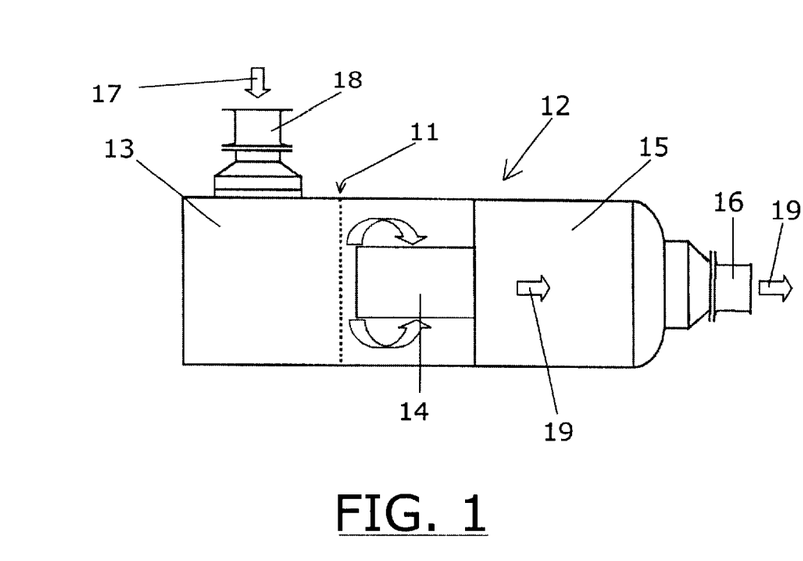
FIG. 1 is a functional representation of air handling equipment and showing a filter slot therein.

Referring to FIG. 1, a representation of air handling equipment, such as a furnace 12 is shown. The furnace 12 is shown comprised of return plenum 13, filter slot 11, blower 14, supply plenum 15, duct 16 and return air duct 18. The blower 14 is positioned to pull cool air from return plenum 13 through filter slot 11. The output air 19 is conditioned (heated, cooled or filtered) by a heat exchanger or the like and pushed by blower 14 through supply plenum 15 and into duct 16 to registers (not shown). The return air 17 is pulled by blower 14, enters the furnace 12 through return air duct 18, and flows into return plenum 13 and through the filter slot 11. The airflow assemblies of the present invention are constructed and arranged for positioning and use in filter slot 11. Filter locations in air handler equipment may be located in various system locations, i.e., the return plenum or a return grille, for example.

Figure 2:
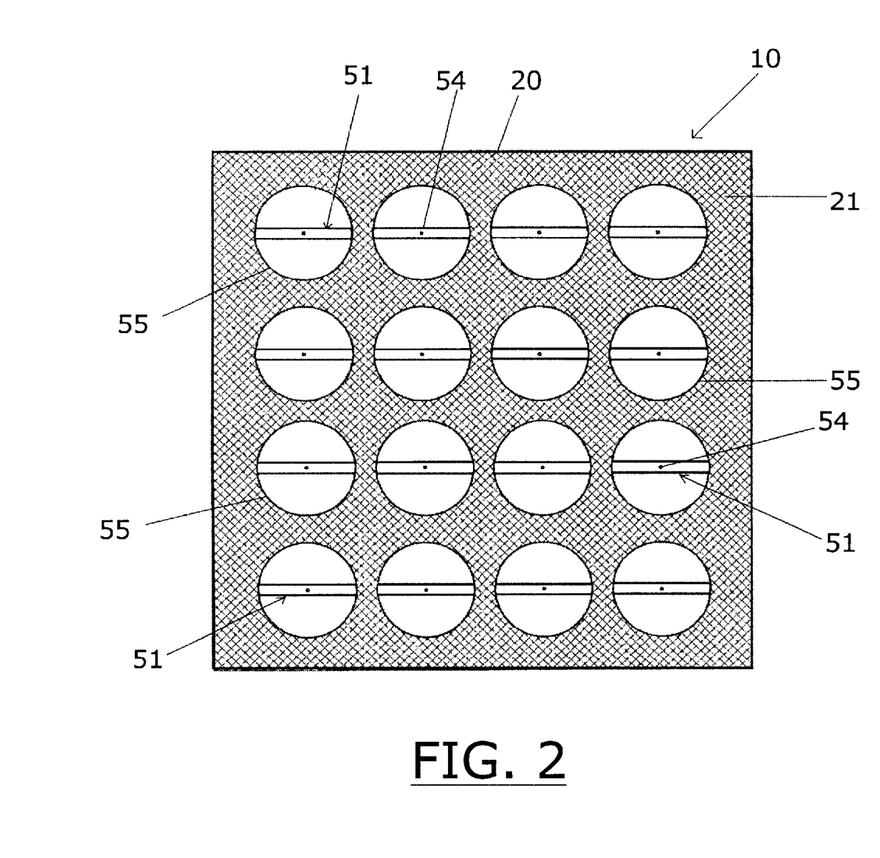
FIG. 2 is an elevational view of the inlet side of an embodiment of the airflow measuring assembly of this invention.
Figure 3:
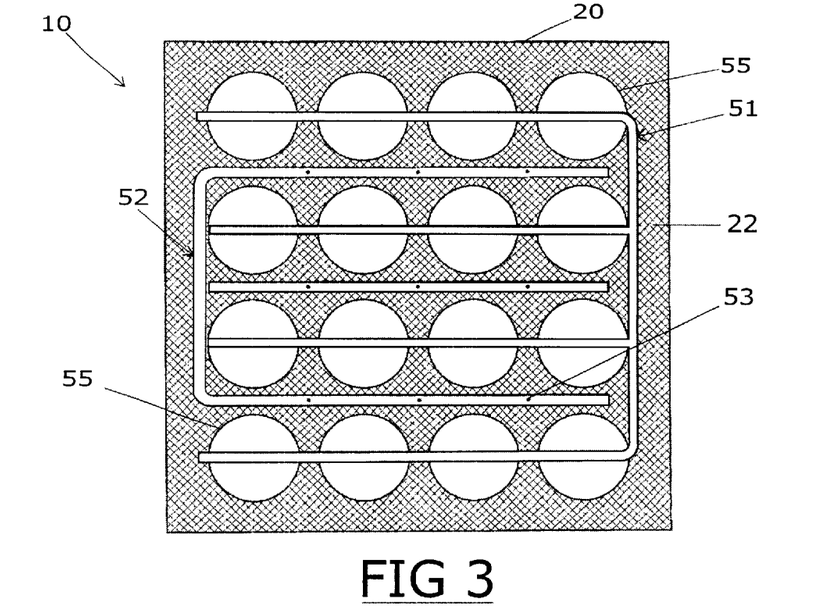
FIG. 3 is a rear elevational view of the airflow measuring assembly of FIG. 2.

FIG. 2 shows a front view of airflow measuring assembly 10. Assembly 10 is shown comprising a plate structure 20, a total pressure measuring assembly 51, an airflow measurement apertures 54, and having plate apertures 55. The apertures 55 are of a predetermined size and, although shown to be circular, may be of other configurations. Measurement structure 51 having apertures 54 can be seen through apertures 55 of the front 21 of plate structure 20. FIG. 3 is a rear view of airflow measuring assembly 10 and the plate structure 20 is shown having a rear side 22 and apertures 55. Measurement structures 51 and 52 are shown attached to the rear side 22 of plate structure 20.

Referring to FIGS. 4–7, airflow measuring assembly embodiment 10 is further shown. Airflow measuring assembly 10 is shown comprised of plate structure 20, a total pressure measuring structure 51, static pressure measuring structure 52 and a connection assembly 56. Measuring structures 51 and 52 are shown generally as E-shaped tubing structures and are constructed and arranged to provide averaged total pressure and the static pressure signals, respectively. Measuring structures 51 and 52 are positioned and attached behind plate structure 20. Measuring structure 51 contains airflow measurement apertures 54 which are preferably front-facing and located in the center of apertures 55 of the plate structure 20. Apertures 54 permit air pressure to act on the total pressure measuring assembly 51 at several predetermined locations of plate 20. Through the apertures 54 air pressure acts on structure 51 where the individual pressure signals are combined with those of the other apertures 54. This arrangement provides an average total pressure reading from structure 51. Apertures 53, similar to apertures 54, are provided with respect to static pressure measurement structure 52. The apertures may be positioned on the top, bottom or rear of the tubing structure 52. Thus, apertures 53 may be positioned within a 180 degree range in the tube structures 52. Through these individual apertures 53 air pressure in the structure 52 is combined or averaged to provide an average static pressure signal.

Figure 4:
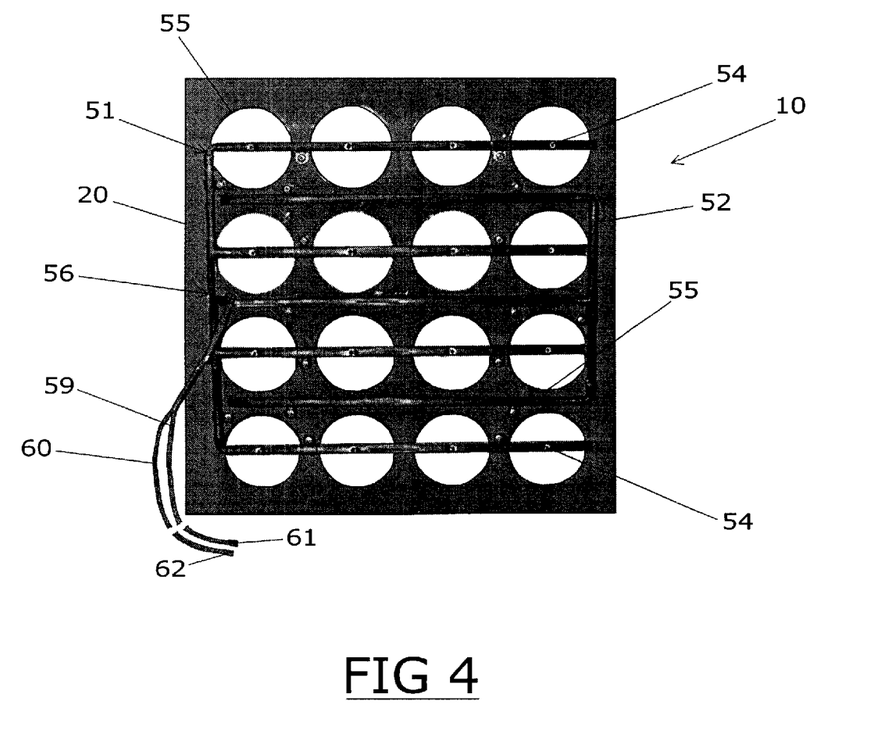
FIG. 4 is a front perspective view of the airflow measuring assembly of FIG. 2.
Figure 5:
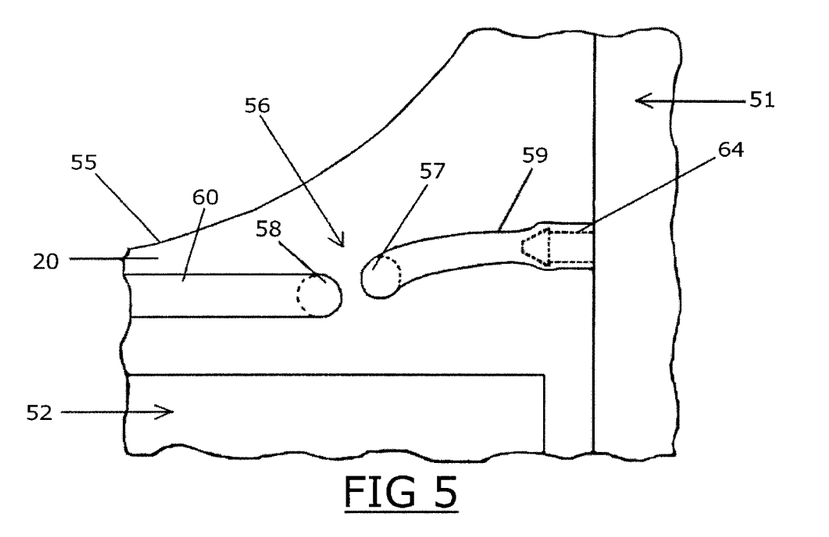
FIG. 5 is an enlarged view of the pressure fitting assembly of the airflow measuring assembly of FIG. 2.
Figure 6:
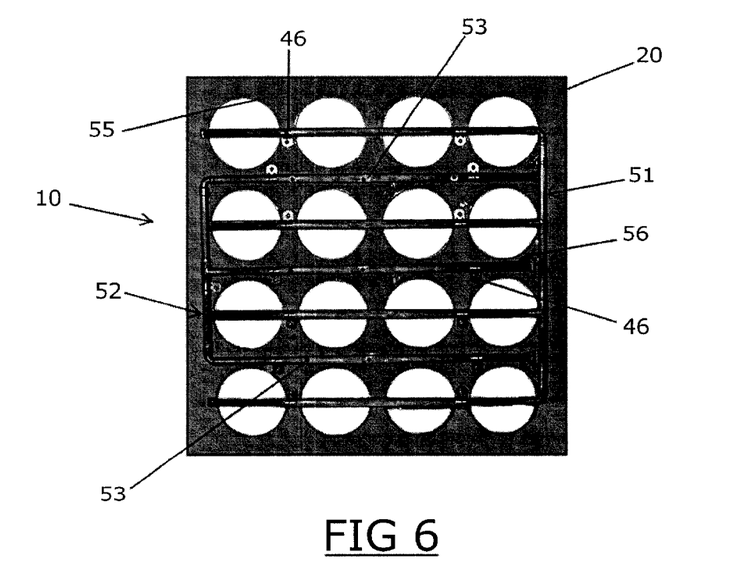
FIG. 6 is a rear perspective view of the airflow measuring assembly of FIG. 2.

As particularly shown in FIGS. 4–6, connection assembly 56 provides averaged total and static pressure signals or measurements from structures 51 and 52, respectively. Tubes 59 and 60 having terminal fittings 61 and 62 extend from connection assembly 56. Connection fittings 61 and 62 are attachable to a manometer, or the like, to provide the difference between the total and static pressure signals. FIG. 5 shows the connection assembly 56 of embodiment 10 comprised of total pressure tubing 59 and static pressure tubing 60 extending through apertures 57 and 58 in plate structure 20. Tubing 59 extends from coupling 64 of structure 51 and provides the averaged total pressure. Tubing 60 extends from a similar coupling of structure 52 and provides the averaged static pressure. As shown in FIG. 4, averaged total and static pressure signal tubing 59 and 60 extend from connection assembly 56 and terminate at manometer connection fittings 61 and 62 which connect to a manometer to provide the total and static pressure signal difference.

Referring to FIG. 6, a rear view of airflow measuring assembly 10 is shown comprising plate structure 20, averaged total and static measurement structures 51 and 52, connection assembly 56 and apertures 55 in plate 20. Measurement structures 51 and 52 are shown attached to the rear of plate structure 20 by fastening brackets or fastening clips 46, however, the structures may be attached by any other known means.

Figure 7:
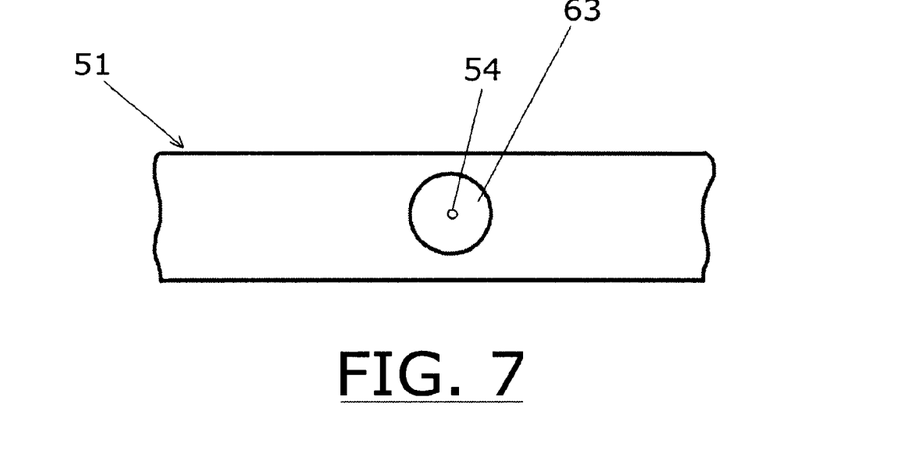
FIG. 7 is a front view of an airflow measuring aperture of the airflow measuring assembly of FIG. 2.

Particularly, FIG. 7 shows an airflow measurement aperture 54. Air flows through aperture 54 and into total pressure measurement structure 51. In measurement structure 51 air pressure from all apertures 54 combine to form an averaged total pressure which is measured. As shown in the drawings, apertures 54 are positioned in generally the center of a concave or hemispherical indentation 63 of rigid tubing structure 51. The concave indentation 63 creates a total or stagnated pressure zone which is relatively insensitive to oncoming fluid streamline directions or angles.

Figure 8:
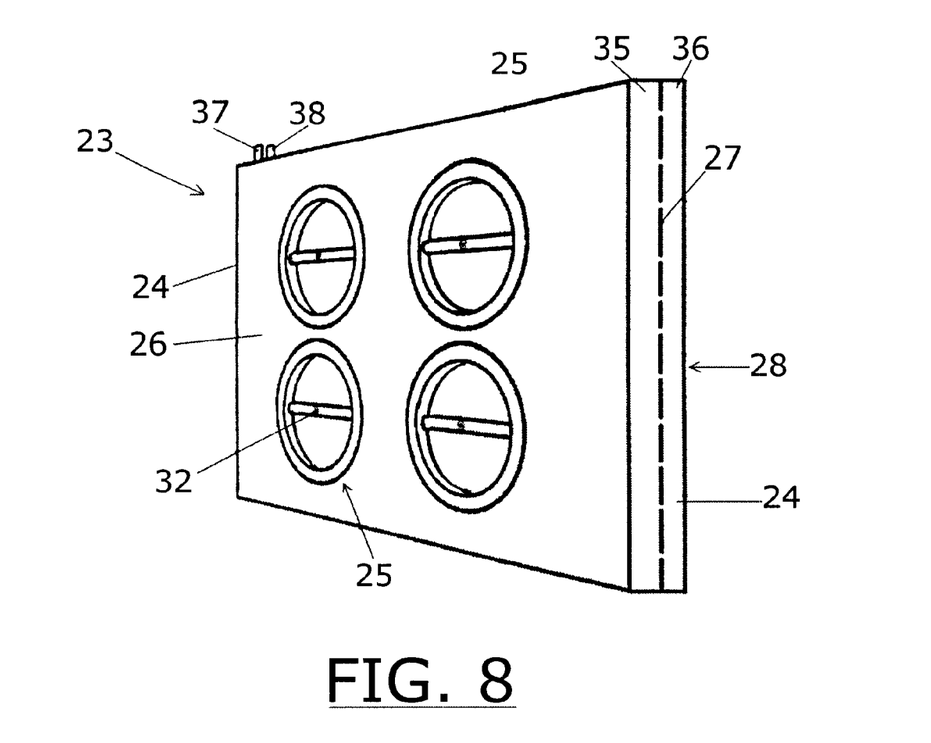
FIG. 8 is a lateral perspective view of another alternate embodiment of the airflow measuring assembly of this. invention.

FIG. 8 shows an alternate embodiment 23 of an airflow measuring assembly comprised of frame structure 24, front plate 26 and airflow sensors 25. Airflow sensor assemblies 25, 49 and 41 are further shown in FIGS. 9–12, and are further described below. Embodiments 10 and 23 show a variety of airflow sensor patterns that may be utilized in the assemblies of the present invention. The airflow sensors and the pattern utilized in the assembly may simulate the resistance of the normal air filter used in the furnace. Sensors 25 are shown arranged in airflow measuring assembly 23. Front plate 26, center plate 27 and rear plate 28 are shown arranged and held in frame structure 24. Plenum 35 is shown formed by front plate 26 and center plate 27. Plenum 36 is shown formed by center plate 27 and rear plate 28. Connector or pressure fitting 37 is shown extending from frame structure 24 and also extends into plenum 35 of assembly 23. Connector or pressure fitting 38 is also shown extending from frame structure 24 and extends into plenum 36. The connector or pressure fittings 37 and 38 are preferably constructed and arranged to receive a differential pressure manometer to read the pressure difference signal generated from assembly 23.

Figures 9, 9A, 10, 11, 12:
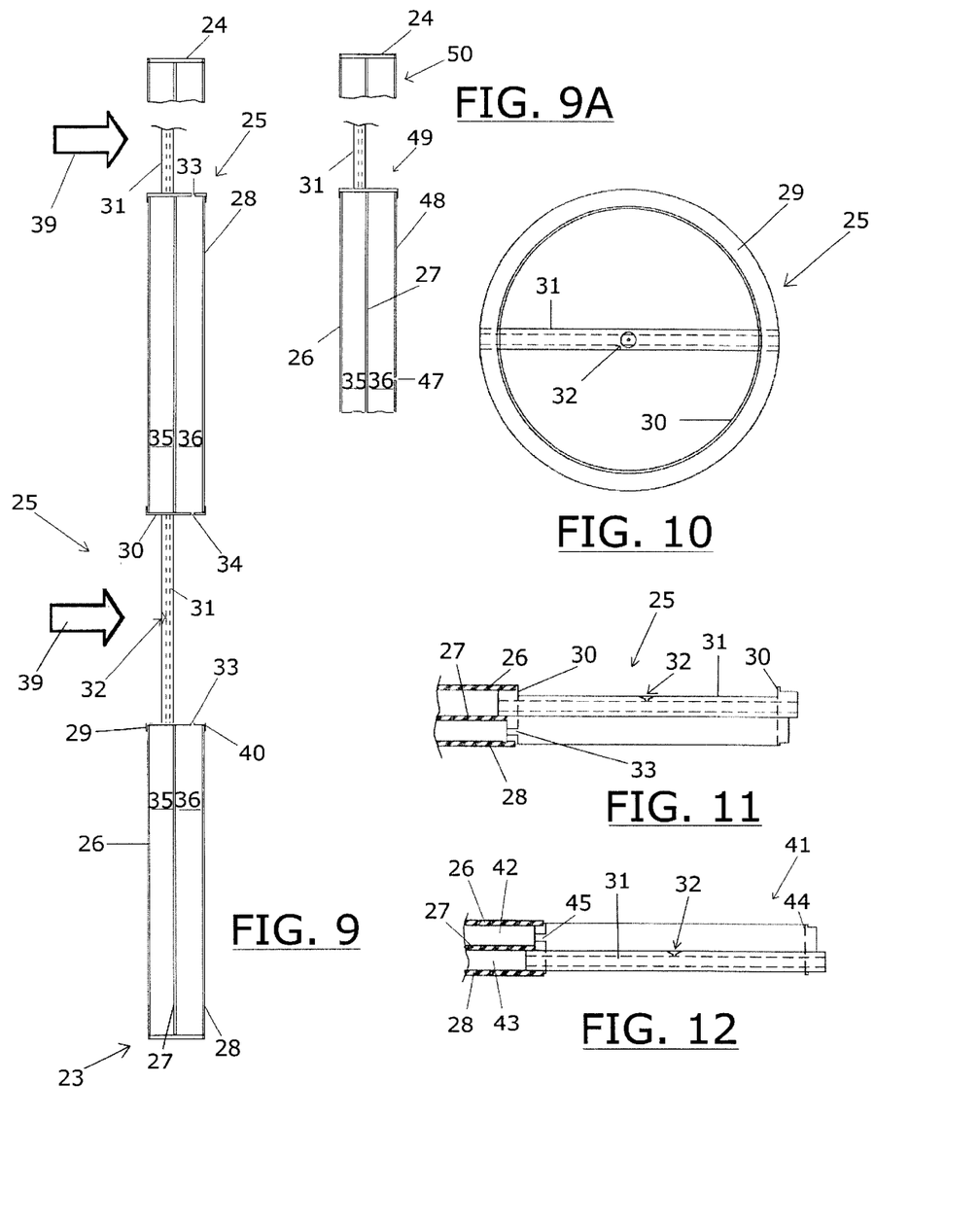
FIG. 9 is a sectional view of the airflow measuring assembly of FIG. 8.
FIG. 9A is an alternate embodiment of the airflow measuring assembly of FIG. 9.
FIG. 10 is a front plan view of the airflow measuring sensor of FIG. 8.
FIG. 11 is a sectional view of the airflow measuring sensor of FIG. 10.
FIG. 12 is a sectional view showing an alternate embodiment of an airflow measuring sensor.

FIG. 9 shows a sectional view of sensors 25 of airflow measuring assembly 23. Plenums 35 and 36 are shown formed by front plate 26 and center plate 27, and by center plate 27 and rear plate 28, respectively. A tubular member 31 is shown spanning across the sensor 25 to interconnect plenum 35 and the member 31 in FIG. 9 is shown located near the front 29 of sensor 25. An aperture 32 is shown positioned in the front of each tubular member 31. Side apertures 33 and 34 are shown in communication with plenum 36 and are shown in FIG. 9 to be positioned in the sides 30 of airflow sensor 25 behind tubular member 31 and near the rear 40 of sensor 25. Airflow depicted by arrow 39 is shown directed through the airflow sensor 25. Aperture(s) 32, preferably having an indented area thereabout, provides an averaged total pressure to be obtained from plenum 35. The side apertures 33 and 34 in airflow sensor 25, in communication with plenum 36, permits and averaged static pressure reading to be obtained. The difference between the averaged total and static pressure signals is the dynamic pressure or the pressure difference of the assembly 23 and may be obtained at connectors 37 and 38 as shown in FIG. 8.

In FIG. 9A, the airflow measuring assembly embodiment 50 is shown to have an airflow sensor 49 which does not have side apertures, unlike the structure of sensor 25. Instead, rear plate 48 is shown to have an aperture 47 which causes plenum 36 to provide an averaged static pressure.

Referring to FIG. 8, the two connectors, such as pressure fittings 37 and 38, are adapted to be attached to a manometer and are in communication with plenums 35 and 36. As shown in FIG. 9, plenums 35 and 36 receive the total pressure and the static pressure, respectively, of the air flowing through assembly 23 of the present invention. Therefore, the manometer can read the dynamic pressure across the assembly. The dynamic pressure is important because when known, the volumetric airflow can be determined. Dynamic pressure, ΔP, and volumetric flow rate, Q, are related by the following equation:

$$Q = K \Delta P^n$$

where K is a constant and n typically has a value of 0.5. K depends on the density of the fluid, the area of the apertures in the plate structure, the relative spacing of these apertures, the viscosity of the fluid, etc., and is determined upon the calibration of the measuring assembly. For example, with a pressure difference of 20 Pascals and a K value of 137 ft$^3$/min/Pa$^{0.5}$ yields an airflow of approximately 613 ft$^3$/min.

FIG. 10 shows a front view of pressure sensor 25. Tubular member 31 extends along a diameter of sensor 25. Aperture 32 is preferably located on the front and in the center of tubular member 31. The front 29 and annular side wall 30 of pressure sensor 25 can be seen. As shown in FIG. 11, tubular member 31 runs across sensor 25 within annular side wall 30, and between front plate 26 and center plate 27. Aperture 32 is shown contained on tubular member 31. Side aperture 33 is shown on sensor side 30 between center plate 27 and rear plate 28.

FIG. 12 shows an alternate embodiment 41 of an airflow sensor. Like embodiment 25, embodiment 41 is constructed and arranged to be contained in and to communicate with plates 26–28. Embodiment 41 comprises annular side wall 44 and tubular member 31 with front-facing aperture 32. Side aperture 45 is contained between front plate 26 and center plate 27 and leads to plenum 42 which contains the static pressure. Tubular member 31 runs within annular side wall 44, between center plate 27 and rear plate 28, and is in communication with plenum 43 which permits a total pressure measurement. In alternate embodiment 41, the side apertures are contained in the annular side wall nearer the front of the sensor than the tubular member.

Figure 13:
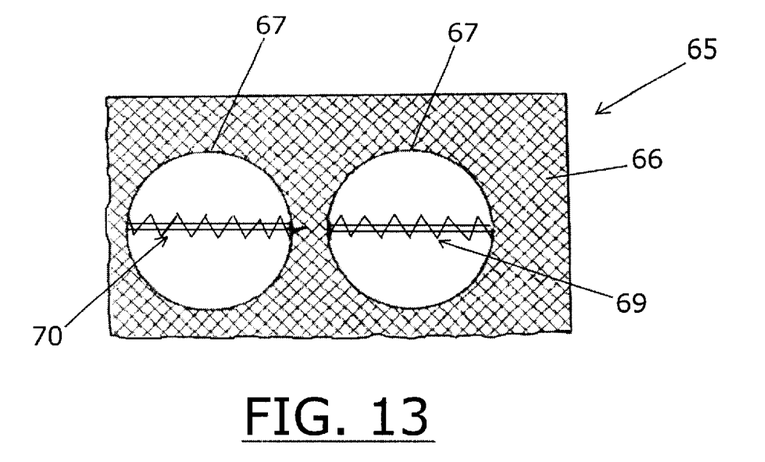
FIG. 13 is a sectional view showing an airflow measuring assembly utilizing hot wire anemometers to measure airflow through the plate apertures.

The airflow through the apertures may be determined by any means known in the art. For example, hot wire anemometers may be utilized, as shown in alternate embodiment 65 of the airflow measuring device of this invention. FIG. 13 shows embodiment 65 having anemometers 69 and 70 which are positioned across each aperture 67 of the plate structure 66. Each anemometer 69 is preferably a hot wire anemometer comprising an electrically heated fine wire of platinum for example. The wire of the anemometer is exposed to the air traveling through each aperture. An increase in airflow cools the wire and changes its electrical resistance. In a constant-current anemometer, air velocity is determined by measuring the wire resistance whereas in a constant-resistance anemometer, air velocity is determined by measuring the current required to maintain the wire temperature, and thus the resistance constant. Either type of anemometer, which differ primarily in electric circuitry and instruments utilized, may be used in accordance with the teachings of the present invention. Other anemometer structures, such as rotating vane, swinging vane, vortex shedding and the like, may also be utilized in the teachings of this invention.

Figure 14:
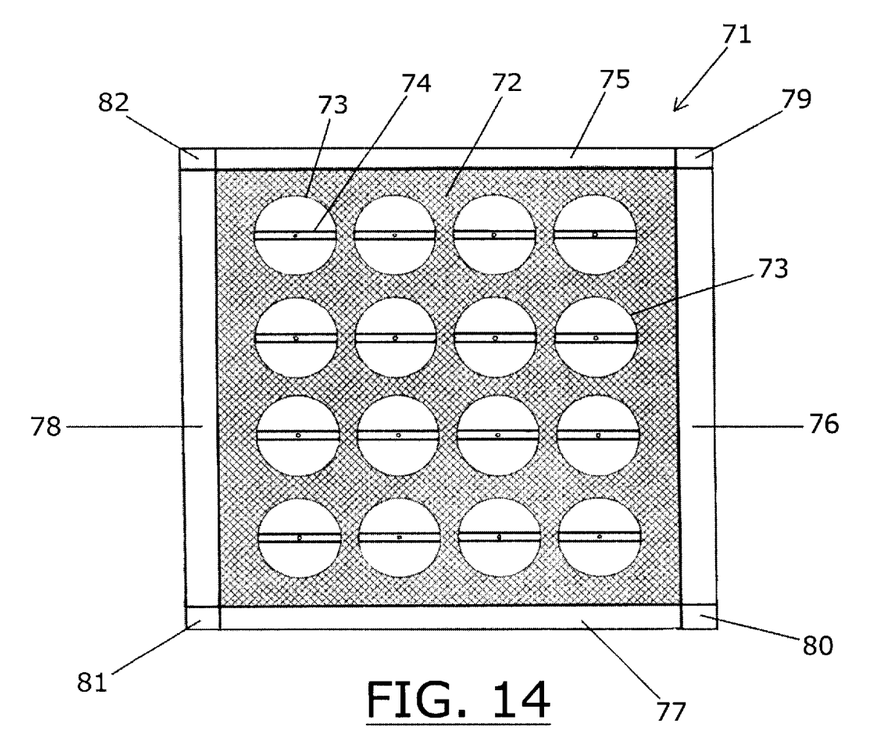
FIG. 14 is a front elevational view showing an adjustable airflow measuring assembly.

As shown in FIG. 14, the airflow measuring assemblies of the present invention may have adjustable features to enable the assemblies to be placed into various size furnace slots. The adjustable assembly 71 is shown to have a plate structure 72 having a plurality of plate apertures 73 with airflow sensors 74 positioned with respect to each aperture. The assembly 71 is shown to have a top insert or extension 75, a bottom insert or extension 77 and side inserts or extensions 76 and 78. The insert or extension members 75–78 may be attached to the plate structure 72 in any manner known in the art. For example the extension members may be hinged, slid or attached to the plate structure 72, the important feature being that air is directed only for flow through the apertures 73 in plate structure 72. Further shown are corner inserts or extensions 79, 80, 81 and 82. The latter inserts may be attached to inserts 75–78, respectively, to thereby completely fill the furnace slot area and to thereby direct airflow through the plate apertures 73 for measurement. For example, insert or extension 79 may be hinged to or slid from either insert 75 or 76.

The adjustable assembly 71 may therefore be utilized in a range of filter slot sizes. As previously discussed, the airflow measuring assemblies of the present invention may be utilized in sizes small, medium and large. The inserts or extensions 75–78 and the corner inserts or extensions 79–82 may be incorporated into each of the three sizes to thereby permit all filter slots having dimensions between these sizes to be effectively tested for airflow measuring purposes according to the teachings of this invention.

In the method of this invention for measuring airflow in an air handling system, first the filter is checked to ensure it is clean. Next a static pressure probe is inserted at a specified location in the air handling system, for example in the downstream corner of the supply plenum. The air handler is then turned on and the static pressure $P_1$ is measured. Next, the filter is replaced by the test assembly, the air handler is turned on and the static pressure $P_2$ is measured at the same specified location. The airflow is now measured through the test assembly. The measured airflow is corrected by multiplying the measured airflow by the calculated correction factor, for example, as described above, and the airflow moving through the air handling system with the filter in place is thereby determined.

In summary, the airflow measuring assemblies of the present invention are constructed and arranged to be positioned in a forced air distribution system, such as incorporated into the system, in the filter slot or a similar slot. Airflow sensors or apertures can be arranged in a variety of configurations, sizes and patterns in an airflow measuring assembly in order to approximate the resistance of a filter in a furnace. This simulated flow resistance permits the airflow measuring assembly to provide accurate readings of the airflow through the filter slot of an air handler and which can be used to estimate duct efficiency. The airflow sensors of the present invention are shown comprised of a tubular body which may be molded of a plastic composition or other suitable materials. The assembly frames and plates may by constructed of a plastic, a metallic or other composition which is impervious to airflow. The assembly frame and plate structures are constructed and arranged in small, medium and large size ranges in order to fit into various filter slots. Also, inserts may be added to the sides or tops of the assemblies to provide a proper fit with minimal air leakage.

As many changes are possible to the embodiments of this invention, utilizing the teachings thereof, the description above and the accompanying drawings should be interpreted in the illustrative and not the limited sense.

That which is claimed is:

1. An assembly for measuring airflow in an HVAC system having an air stream, said assembly comprising:
    a) an impervious structure with at least one opening of a predetermined configuration, said structure for placement in the HVAC system to condition and direct airflow therethrough at a specified position in the air stream of said HVAC system; and
    b) means to measure airflow through said at least one opening of said impervious structure, said means to measure airflow further comprising a static pressure measuring structure and a total pressure measuring structure, said means being constructed and arranged to provide static and total pressure signals, respectively, said means to measure further having a pressure differential sensing device to thereby determine the volumetric airflow through said HVAC system by utilizing the pressure differential between said static and total pressure signals.

2. The assembly of claim 1 wherein said impervious structure is constructed and arranged for placement in a slot or a filter holder of said HVAC system.

3. The assembly of claim 2 wherein the HVAC system has an air handler unit and an air filter holder proximate the air handler unit and wherein said impervious structure is placed in the filter holder proximate the air handler unit.

4. The assembly of claim 1 wherein said impervious structure is adjustable in area to accommodate a range of slot dimensions in said HVAC system.

5. An airflow measuring assembly for an air handling system comprising:
    a) a plate assembly having at least one plate structure and a specified configuration and being constructed and arranged to be installed in an air handling system;
    b) at least one aperture through said plate structure, said at least one aperture being constructed and arranged through said plate structure to direct airflow through said plate assembly; and
    c) means to measure airflow through said at least one aperture, said means to measure airflow being comprised of a first airflow sensor positioned in each said at least one aperture of said plate structure, said first airflow sensors being interconnected to provide an averaged total pressure reading, a second air pressure sensor for measuring static pressure and having means to provide an averaged static pressure reading, and means to provide the pressure differential between said averaged total pressure and said averaged static pressure.

6. The airflow measuring assembly of claim 5 wherein said means to measure airflow includes a pressure differential sensor.

7. The airflow measuring assembly of claim 5 wherein said plate assembly has a generally rectangular configuration and wherein said at least one aperture through said plate structure simulates the airflow resistance of the air handler system filter.

8. The airflow measuring assembly of claim 5 wherein said plate assembly is adjustable in area and wherein said plate assembly is provided in a size range to accommodate specified dimensions of said air handling system.

9. The airflow measuring assembly of claim 5 wherein said second air pressure sensor is positioned behind said plate structure.

10. The airflow measuring assembly of claim 9, wherein said means to measure the pressure differential between said first and second air pressure sensors, further comprises connectors constructed and arranged to receive a manometer.

11. The airflow measuring assembly of claim 5, wherein said plate assembly comprises a front plate, a center plate spaced from said front plate and a rear plate spaced from said center plate, said front plate, center plate and said rear plate each having said at least one aperture axially aligned therethrough, said assembly further having a periphery comprising a peripheral edge to define a first plenum between said front plate and said center plate and a second plenum between said center plate and said rear plate.

12. The airflow measuring assembly of claim 11, wherein said assembly has a plurality of aligned apertures through said front plate, center plate and said rear plate, said assembly further comprising an airflow sensor assembly positioned through each said aperture in said plate assembly and extending from said front plate to said rear plate.

13. The airflow measuring assembly of claim 12, wherein said plurality of airflow sensors are arranged in a predetermined pattern to simulate the airflow resistance of a furnace air filter and wherein said plurality of airflow sensors are constructed and arranged to be in communication with said plenums of said plate assembly.

14. The airflow measuring assembly of claim 12, wherein each said airflow sensor is comprised of a molded tubular body having a circular cross-section, a front, an annular side wall and a rear, a tubular member extending within said side wall and across a diameter of said sensor and having a generally centrally disposed aperture, and at least one aperture in said annular side wall in communication with said second plenum, said tubular member of each said sensor being in communication with said first plenum.

15. The airflow measuring assembly of claim 14, wherein said tubular members of said airflow sensors are interconnected to measure total pressure and wherein said apertures in said side wall are interconnected to measure static pressure.

16. A method for measuring airflow in an air handling system having a slot therein comprising:
 a) inserting an airflow measuring assembly in the slot of the air handling system, said airflow measuring assembly comprising:
  1. an impervious structure with at least one opening of a predetermined configuration, said structure for placement in the air handling system to condition and direct airflow therethrough at a specified position in the fluid stream of the air handling system; and
  2. means to measure airflow through said at least one opening of said impervious structure, said means to measure airflow comprising a static pressure measuring structure and a total pressure measuring structure, said means to measure being constructed and arranged to provide static and total pressure signals, respectively; and
 b) measuring volumetric airflow through said at least one opening of said impervious structure of said airflow measuring assembly by determining the pressure differential between said static and total pressure signals from said static and total pressure measuring structures.

17. The method of claim 16 wherein said airflow measuring assembly of step (a) is inserted in a filter slot proximate the air handler of the air handling system.

18. The method of claim 16 wherein said airflow measuring assembly has a plurality of openings in said impervious structure and wherein the airflow is measured at each said opening.

19. The method of claim 16 wherein said airflow measuring assembly has a plurality of openings in said impervious structure and wherein the total pressure signals and static pressure signals are averaged to provide an averaged total pressure signal and an averaged static pressure signal.

20. The method of claim 16 further comprising correcting the measured flow rate by measuring a first static pressure in the air handling system with a filter in the filter slot, by measuring a second static pressure at the same position in the air handling system with the airflow measuring assembly in the filter slot and correcting the flow rate by a mathematical relationship.

21. The method of claim 20 wherein said mathematical relationship for correcting the flow rate is multiplying the flow rate by the square root of the quotient of the first static pressure divided by the second static pressure.

22. An airflow measuring assembly for installation in an air handling apparatus air filter slot having specified dimensions, comprising:
 a) a plate assembly;
 b) said plate assembly having a plurality of apertures therein, said apertures being arranged in a predetermined pattern to direct airflow through said plate assembly and to simulate the resistance of an air filter; and
 c) means to measure the volumetric airflow through said apertures in said plate assembly, said means to measure the volumetric airflow having a means to provide and measure a total pressure signal and a means to provide and measure a static pressure signal, said means to provide total pressure signal being positioned behind said plate assembly and having a plurality of front-facing air pressure apertures positioned at generally the center of each said plurality of apertures in said plate assembly and said means to provide static pressure being positioned behind said plate assembly and having a plurality of rear facing air pressure apertures.

23. The airflow measuring assembly of claim 22, wherein said means to measure the volumetric airflow includes connectors constructed and arranged to receive a manometer to provide a total and static pressure signal differential.

24. The airflow measuring assembly of claim 22, wherein said means to provide total and static pressures further provide averaged pressure values.

25. The airflow measuring assembly of claim 23, wherein said plate assembly is comprised of a front plate, a center plate spaced from said front plate and a rear plate spaced from said second plate, said spaced plates forming a first plenum and a second plenum.

26. The airflow measuring assembly of claim 25, wherein said assembly further comprises a plurality of airflow sensors each being positioned in each said plurality of apertures in said plate assembly and wherein said sensors are in communication with said plenums of said plate assembly.

27. The airflow measuring assembly of claim 26, wherein each said airflow sensor is comprised of a molded tubular body having a generally circular cross-section, a front, an annular side wall and a rear, a tubular member extending within said side wall and across a diameter of said sensor and having a generally centrally disposed aperture, and at least one aperture in said annular side wall.

28. The airflow measuring assembly of claim 27, wherein said tubular members of said airflow sensors are in communication with said first plenum to provide an averaged value of total pressure and wherein said apertures in said side wall are in communication with said second plenum to provide an averaged value of the static pressure.

29. The airflow measuring assembly of claim 28, wherein said assembly has a pair of connectors, said connectors being in communication with said first and second plenums to measure the pressure differential between the total and static pressures.

30. An airflow measuring assembly for insertion into the filter slot of an HVAC system, said assembly comprising:
 a) a plate structure having a plurality of openings and being constructed and arranged for placement into the filter slot of the HVAC system, said plate structure and said openings therethrough being constructed and arranged to simulate the airflow resistance of a slot filter;
 b) airflow measuring sensing means disposed in each said opening of said plate structure; and
 c) means to provide a total airflow signal from said airflow measuring sensing means.

31. The assembly of claim 30, wherein said plate structure is adjustable in area to accommodate a range of slot dimensions in said HVAC system.

32. The assembly of claim 30, wherein said airflow measuring sensing means is further comprised of an anemometer or a pressure differential sensing device.

33. The assembly of claim 30, wherein said plate structure has a generally rectangular configuration and wherein said plate structure with said openings simulate the airflow resistance of the air handler system filter.

34. The assembly of claim 30, wherein said plate structure comprises a front plate, a center plate spaced from said front plate and a rear plate spaced from said center plate, said front plate, center plate and said rear plate each having openings axially aligned therethrough, said assembly further having a periphery comprising a peripheral edge to define a first plenum between said front plate and said center plate and a second plenum between said center plate and said rear plate.

35. The assembly of claim 30, wherein said means to provide total and static pressures further provide averaged pressure values.

36. The assembly of claim 30, wherein said airflow measuring sensing means is comprised of a static measuring structure, a total pressure measuring structure and a pressure differential sensing means.

37. The assembly of claim 36, wherein said static measuring structure and said total pressure measuring structure are disposed in a plane behind and adjacent said plate structure.

\* \* \* \* \*

UNITED STATES PATENT AND TRADEMARK OFFICE
CERTIFICATE OF CORRECTION

PATENT NO. : 6,439,061 B1  Page 1 of 1
APPLICATION NO. : 09/539085
DATED : August 27, 2002
INVENTOR(S) : Nelson et al.

It is certified that error appears in the above-identified patent and that said Letters Patent is hereby corrected as shown below:

Column 1, line 6, please insert the following:

-- Statement of Government Interest

This invention was made with Government support under DE-FG03-97ER86060 awarded by the Department of Energy. The Government has certain rights in this invention. --

Signed and Sealed this

Fourth Day of November, 2008

JON W. DUDAS
*Director of the United States Patent and Trademark Office*